(12) United States Patent  (10) Patent No.: US 8,365,767 B2
Davidson et al.  (45) Date of Patent: Feb. 5, 2013

(54) USER INTERFACE FOR A FAUCET

(75) Inventors: Kyle Robert Davidson, Noblesville, IN (US); Michael J. Veros, Indianapolis, IN (US); Austin Ray Murray, Fort Wayne, IN (US); Paul D. Koottungal, Indianapolis, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 883 days.

(21) Appl. No.: 12/255,358

(22) Filed: Oct. 21, 2008

(65) Prior Publication Data

US 2009/0039176 A1    Feb. 12, 2009

Related U.S. Application Data

(63) Continuation-in-part of application No. 11/700,566, filed on Jan. 31, 2007, now Pat. No. 8,118,240, which is a continuation-in-part of application No. 11/737,727, filed on Apr. 19, 2007, now Pat. No. 8,162,236.

(60) Provisional application No. 60/794,229, filed on Apr. 20, 2006.

(51) Int. Cl.
    *F16K 37/00* (2006.01)
(52) U.S. Cl. .................. 137/559; 251/129.04; 4/623
(58) Field of Classification Search ............ 251/129.04, 251/129.3, 129.05, 129.06; 236/12.12; 4/623; 137/559
    See application file for complete search history.

(56) References Cited

U.S. PATENT DOCUMENTS

| | | |
|---|---|---|
| 2,337,321 A | 12/1943 | Freeman |
| 2,991,481 A | 7/1961 | Book |
| 3,081,594 A | 3/1963 | Atkins et al. |
| 3,151,340 A | 10/1964 | Teshima |
| 3,254,313 A | 5/1966 | Atkins et al. |
| 3,314,081 A | 4/1967 | Atkins et al. |
| 3,406,941 A | 10/1968 | Ichimori et al. |
| 3,588,038 A | 6/1971 | Tanaka |
| 3,651,989 A | 3/1972 | Westrich |
| 3,672,479 A | 6/1972 | Schwertfeger et al. |
| 3,685,541 A | 8/1972 | Braucksick et al. |
| 3,705,574 A | 12/1972 | Duncan |
| 3,756,456 A | 9/1973 | Georgi |
| 3,762,440 A | 10/1973 | Bryant |
| 3,799,171 A | 3/1974 | Patel |
| 3,987,819 A | 10/1976 | Scheuermann |
| 4,172,381 A | 10/1979 | Aigner |
| 4,185,336 A | 1/1980 | Young |
| 4,200,018 A | 4/1980 | Sekiwa |
| 4,201,518 A | 5/1980 | Stevenson |
| 4,280,530 A | 7/1981 | Yi |
| 4,331,292 A | 5/1982 | Zimmer |
| 4,337,388 A | 6/1982 | July |
| 4,359,186 A | 11/1982 | Kiendl |
| 4,406,313 A | 9/1983 | Bennett et al. |

(Continued)

FOREIGN PATENT DOCUMENTS

| CA | 2492226 A1 | 7/2005 |
|---|---|---|
| DE | 3339849 | 5/1985 |

(Continued)

OTHER PUBLICATIONS

Phillip, "Tough Touch Screen", appliance design, Feb. 2006, pp. 14-17.

(Continued)

*Primary Examiner* — John K Fristoe, Jr.
*Assistant Examiner* — Matthew W Jellett
(74) *Attorney, Agent, or Firm* — Faegre Baker Daniels LLP

(57) ABSTRACT

An electronic user interface for use with a water delivery device, such as a faucet.

28 Claims, 6 Drawing Sheets

U.S. PATENT DOCUMENTS

| | | | |
|---|---|---|---|
| 4,406,398 A | 9/1983 | Perkins | |
| 4,407,444 A | 10/1983 | Knebel et al. | |
| 4,409,694 A | 10/1983 | Barrett et al. | |
| 4,410,791 A | 10/1983 | Eastep | |
| 4,420,811 A | 12/1983 | Tarnay et al. | |
| 4,421,269 A | 12/1983 | Ts'ao | |
| 4,424,767 A | 1/1984 | Wicke et al. | |
| 4,429,422 A | 2/1984 | Wareham | |
| 4,436,983 A | 3/1984 | Solobay | |
| 4,439,669 A | 3/1984 | Ryffel | |
| 4,450,829 A | 5/1984 | Morita et al. | |
| 4,459,465 A | 7/1984 | Knight | |
| 4,503,575 A | 3/1985 | Knoop et al. | |
| 4,532,962 A | 8/1985 | Campau | |
| 4,537,348 A | 8/1985 | Gossi | |
| 4,541,562 A | 9/1985 | Zukausky | |
| 4,554,688 A | 11/1985 | Puccerella | |
| 4,563,780 A | 1/1986 | Pollack | |
| 4,567,350 A | 1/1986 | Todd, Jr. | |
| 4,581,707 A | 4/1986 | Millar | |
| 4,584,463 A | 4/1986 | Klages et al. | |
| 4,604,515 A | 8/1986 | Davidson | |
| 4,604,764 A | 8/1986 | Enzo | |
| 4,606,325 A | 8/1986 | Lujan | |
| 4,611,757 A | 9/1986 | Saether | |
| 4,628,902 A | 12/1986 | Comber | |
| 4,638,147 A | 1/1987 | Dytch et al. | |
| 4,674,678 A | 6/1987 | Knebel et al. | |
| 4,680,446 A | 7/1987 | Post | |
| 4,682,581 A | 7/1987 | Laing et al. | |
| 4,682,728 A | 7/1987 | Oudenhoven et al. | |
| 4,688,277 A | 8/1987 | Kakinoki et al. | |
| 4,693,415 A | 9/1987 | Sturm | |
| 4,700,884 A | 10/1987 | Barrett et al. | |
| 4,700,885 A | 10/1987 | Knebel | |
| 4,709,728 A | 12/1987 | Ying-Chung | |
| 4,713,525 A | 12/1987 | Eastep | |
| 4,735,357 A | 4/1988 | Gregory et al. | |
| 4,738,280 A | 4/1988 | Oberholtzer | |
| 4,742,456 A | 5/1988 | Kamena | |
| 4,750,472 A | 6/1988 | Fazekas | |
| 4,753,265 A | 6/1988 | Barrett et al. | |
| 4,756,030 A | 7/1988 | Juliver | |
| 4,757,943 A | 7/1988 | Sperling et al. | |
| 4,762,273 A | 8/1988 | Gregory et al. | |
| 4,768,705 A | 9/1988 | Tsutsui et al. | |
| 4,786,782 A | 11/1988 | Takai et al. | |
| 4,798,224 A | 1/1989 | Haws | |
| 4,808,793 A | 2/1989 | Hurko | |
| 4,832,259 A | 5/1989 | Vandermeyden | |
| 4,845,316 A | 7/1989 | Kaercher | |
| 4,854,498 A | 8/1989 | Stayton | |
| 4,869,287 A | 9/1989 | Pepper | |
| 4,869,427 A | 9/1989 | Kawamoto et al. | |
| 4,870,986 A | 10/1989 | Barrett et al. | |
| 4,872,485 A | 10/1989 | Laverty | |
| 4,875,623 A | 10/1989 | Garris | |
| 4,893,653 A | 1/1990 | Ferrigno | |
| 4,896,658 A | 1/1990 | Yonekubo et al. | |
| 4,901,915 A | 2/1990 | Sakakibara | |
| 4,909,435 A | 3/1990 | Kidouchi et al. | |
| 4,914,758 A | 4/1990 | Shaw | |
| 4,916,613 A | 4/1990 | Lange et al. | |
| 4,917,142 A | 4/1990 | Laing et al. | |
| 4,923,116 A | 5/1990 | Homan | |
| 4,930,551 A | 6/1990 | Haws | |
| 4,936,289 A | 6/1990 | Peterson | |
| 4,936,508 A | 6/1990 | Ingalz | |
| 4,941,608 A | 7/1990 | Shimizu et al. | |
| 4,945,942 A | 8/1990 | Lund | |
| 4,945,943 A | 8/1990 | Cogger | |
| 4,955,535 A | 9/1990 | Tsutsui et al. | |
| 4,965,894 A | 10/1990 | Baus | |
| 4,967,794 A | 11/1990 | Tsutsui et al. | |
| 4,969,598 A | 11/1990 | Garris | |
| 4,970,373 A | 11/1990 | Lutz et al. | |
| 4,971,106 A | 11/1990 | Tsutsui et al. | |
| 4,998,673 A | 3/1991 | Pilolla | |
| 5,009,572 A | 4/1991 | Imhoff et al. | |
| 5,020,127 A | 5/1991 | Eddas et al. | |
| 5,033,508 A | 7/1991 | Laverty | |
| 5,033,715 A | 7/1991 | Chiang | |
| 5,040,106 A | 8/1991 | Maag | |
| 5,042,524 A | 8/1991 | Lund | |
| 5,056,712 A | 10/1991 | Enck | |
| 5,057,214 A | 10/1991 | Morris | |
| 5,058,804 A | 10/1991 | Yonekubo et al. | |
| 5,063,955 A | 11/1991 | Sakakibara | |
| 5,073,991 A | 12/1991 | Marty | |
| 5,074,520 A | 12/1991 | Lee et al. | |
| 5,086,526 A | 2/1992 | Van Marcke | |
| 5,092,560 A | 3/1992 | Chen | |
| 5,095,945 A * | 3/1992 | Jensen | 137/607 |
| 5,105,846 A | 4/1992 | Britt | |
| 5,124,934 A | 6/1992 | Kawamoto et al. | |
| 5,125,433 A | 6/1992 | DeMoss et al. | |
| 5,129,034 A | 7/1992 | Sydenstricker | |
| 5,133,089 A | 7/1992 | Tsutsui et al. | |
| 5,139,044 A | 8/1992 | Otten et al. | |
| 5,143,049 A | 9/1992 | Laing et al. | |
| 5,148,824 A | 9/1992 | Wilson et al. | |
| 5,170,361 A | 12/1992 | Reed | |
| 5,170,514 A | 12/1992 | Weigert | |
| 5,170,816 A | 12/1992 | Schnieders | |
| 5,170,944 A | 12/1992 | Shirai | |
| 5,174,495 A | 12/1992 | Eichholz et al. | |
| 5,175,892 A | 1/1993 | Shaw | |
| 5,183,029 A | 2/1993 | Ranger | |
| 5,184,642 A * | 2/1993 | Powell | 137/607 |
| 5,187,816 A | 2/1993 | Chiou | |
| 5,202,666 A | 4/1993 | Knippscheer | |
| 5,205,318 A | 4/1993 | Massaro et al. | |
| 5,206,963 A | 5/1993 | Wiens | |
| 5,217,035 A | 6/1993 | Van Marcke | |
| 5,224,509 A | 7/1993 | Tanaka et al. | |
| 5,224,685 A | 7/1993 | Chiang et al. | |
| 5,226,629 A | 7/1993 | Millman et al. | |
| 5,243,717 A | 9/1993 | Yasuo | |
| D340,279 S | 10/1993 | Mattis | |
| 5,257,341 A | 10/1993 | Austin et al. | |
| 5,261,443 A | 11/1993 | Walsh | |
| 5,262,621 A | 11/1993 | Hu et al. | |
| 5,265,318 A | 11/1993 | Shero | |
| 5,277,219 A | 1/1994 | Lund | |
| 5,287,570 A | 2/1994 | Peterson et al. | |
| 5,315,719 A | 5/1994 | Tsutsui et al. | |
| 5,323,803 A | 6/1994 | Blumenauer | |
| 5,325,822 A | 7/1994 | Fernandez | |
| 5,334,819 A | 8/1994 | Lin | |
| 5,341,839 A | 8/1994 | Kobayashi et al. | |
| 5,351,712 A | 10/1994 | Houlihan | |
| 5,358,177 A | 10/1994 | Cashmore | |
| 5,361,215 A | 11/1994 | Tompkins et al. | |
| 5,362,026 A | 11/1994 | Kobayashi et al. | |
| 5,385,168 A | 1/1995 | Lund | |
| 5,400,961 A | 3/1995 | Tsutsui et al. | |
| 5,408,578 A | 4/1995 | Bolivar | |
| 5,409,037 A | 4/1995 | Wheeler et al. | |
| 5,419,930 A | 5/1995 | Schucker | |
| 5,429,272 A | 7/1995 | Luigi | |
| 5,431,302 A | 7/1995 | Tulley et al. | |
| 5,433,342 A | 7/1995 | Luro | |
| 5,437,003 A | 7/1995 | Blanco | |
| RE35,018 E | 8/1995 | Homan | |
| 5,438,642 A | 8/1995 | Posen | |
| 5,467,967 A | 11/1995 | Gillooly | |
| 5,479,558 A | 12/1995 | White et al. | |
| 5,482,250 A | 1/1996 | Kodaira | |
| 5,504,306 A | 4/1996 | Russell et al. | |
| 5,504,950 A * | 4/1996 | Natalizia et al. | 4/623 |
| 5,511,579 A | 4/1996 | Price | |
| 5,511,723 A | 4/1996 | Eki et al. | |
| 5,540,555 A | 7/1996 | Corso et al. | |
| 5,550,753 A | 8/1996 | Tompkins et al. | |
| 5,555,912 A | 9/1996 | Saadi et al. | |
| 5,564,462 A | 10/1996 | Storch | |
| 5,566,702 A | 10/1996 | Philipp | |

| | | | | | | |
|---|---|---|---|---|---|---|
| 5,570,869 A | 11/1996 | Diaz et al. | 6,305,075 B1 | 10/2001 | Ersoy et al. | |
| 5,572,985 A | 11/1996 | Benham | 6,315,208 B1 | 11/2001 | Doyle | |
| 5,575,424 A | 11/1996 | Fleischmann | 6,317,717 B1 | 11/2001 | Lindsey et al. | |
| 5,577,660 A | 11/1996 | Hansen | 6,321,785 B1 | 11/2001 | Bergmann | |
| 5,584,316 A | 12/1996 | Lund | 6,337,635 B1 | 1/2002 | Ericksen et al. | |
| 5,586,572 A | 12/1996 | Lund | 6,340,032 B1 | 1/2002 | Zosimadis | |
| 5,588,636 A | 12/1996 | Eichholz et al. | 6,341,389 B2 | 1/2002 | Philipps-Liebich et al. | |
| 5,595,342 A | 1/1997 | McNair et al. | 6,351,603 B2 | 2/2002 | Waithe et al. | |
| 5,603,344 A | 2/1997 | Hall | 6,363,549 B2 | 4/2002 | Humpert et al. | |
| 5,610,589 A | 3/1997 | Evans et al. | 6,377,009 B1 | 4/2002 | Philipp | |
| 5,622,203 A | 4/1997 | Givler et al. | 6,381,770 B1 | 5/2002 | Raisch | |
| 5,623,990 A | 4/1997 | Pirkle | 6,389,226 B1 | 5/2002 | Neale et al. | |
| 5,627,375 A | 5/1997 | Hsieh | 6,438,770 B1 | 8/2002 | Hed et al. | |
| 5,634,220 A | 6/1997 | Chiu | 6,445,306 B1 | 9/2002 | Trovato et al. | |
| 5,682,032 A | 10/1997 | Philipp | 6,446,875 B1 | 9/2002 | Brooks et al. | |
| 5,694,653 A | 12/1997 | Harald | 6,452,514 B1 | 9/2002 | Philipp | |
| 5,730,165 A | 3/1998 | Philipp | RE37,888 E | 10/2002 | Cretu-Petra | |
| 5,735,291 A | 4/1998 | Kaonohi | 6,457,355 B1 | 10/2002 | Philipp | |
| 5,758,688 A | 6/1998 | Hamanaka et al. | 6,466,036 B1 | 10/2002 | Philipp | |
| 5,769,120 A | 6/1998 | Laverty et al. | 6,473,917 B1 | 11/2002 | Mateina | |
| 5,775,372 A | 7/1998 | Houlihan | 6,474,951 B2 | 11/2002 | Stephan et al. | |
| 5,784,531 A | 7/1998 | Mann et al. | 6,513,787 B1 | 2/2003 | Jeromson et al. | |
| 5,790,024 A | 8/1998 | Ripingill et al. | 6,522,078 B1 | 2/2003 | Okamoto et al. | |
| 5,812,059 A | 9/1998 | Shaw et al. | 6,535,200 B2 | 3/2003 | Philipp | |
| 5,813,655 A | 9/1998 | Pinchott et al. | 6,536,464 B1 | 3/2003 | Lum et al. | |
| 5,819,366 A | 10/1998 | Edin | 6,549,816 B2 | 4/2003 | Gauthier et al. | |
| 5,823,229 A | 10/1998 | Bertrand et al. | 6,574,426 B1 | 6/2003 | Blanco, Jr. | |
| 5,829,467 A | 11/1998 | Spicher | 6,588,377 B1 | 7/2003 | Leary et al. | |
| 5,829,475 A | 11/1998 | Acker | 6,588,453 B2 | 7/2003 | Marty et al. | |
| 5,845,844 A | 12/1998 | Zosimodis | 6,598,245 B2 | 7/2003 | Nishioka | |
| 5,853,130 A | 12/1998 | Ellsworth | 6,612,267 B1 | 9/2003 | West | |
| 5,855,356 A | 1/1999 | Fait | 6,619,320 B2 | 9/2003 | Parsons | |
| 5,857,717 A | 1/1999 | Caffrey | 6,622,930 B2 | 9/2003 | Laing et al. | |
| 5,868,311 A | 2/1999 | Cretu-Petra | 6,629,645 B2 | 10/2003 | Mountford et al. | |
| 5,872,891 A | 2/1999 | Son | 6,639,209 B1 | 10/2003 | Patterson et al. | |
| 5,893,387 A | 4/1999 | Paterson et al. | 6,644,333 B2 | 11/2003 | Gloodt | |
| 5,918,855 A | 7/1999 | Hamanaka et al. | 6,659,048 B1 | 12/2003 | DeSantis et al. | |
| 5,934,325 A | 8/1999 | Brattoli et al. | 6,676,024 B1 | 1/2004 | McNerney et al. | |
| 5,941,275 A | 8/1999 | Laing | 6,684,822 B1 | 2/2004 | Lieggi | |
| 5,944,221 A | 8/1999 | Laing et al. | 6,691,338 B2 | 2/2004 | Zieger | |
| 5,961,095 A | 10/1999 | Schrott | 6,705,534 B1 | 3/2004 | Mueller | |
| 5,963,624 A | 10/1999 | Pope | 6,707,030 B1 | 3/2004 | Watson | |
| 5,966,753 A | 10/1999 | Gauthier et al. | 6,734,685 B2 | 5/2004 | Rudrich | |
| 5,979,776 A | 11/1999 | Williams | 6,738,996 B1 | 5/2004 | Malek et al. | |
| 5,983,922 A | 11/1999 | Laing et al. | 6,757,921 B2 | 7/2004 | Esche | |
| 6,000,170 A | 12/1999 | Davis | 6,768,103 B2 | 7/2004 | Watson | |
| 6,003,170 A | 12/1999 | Humpert et al. | 6,770,869 B2 | 8/2004 | Patterson et al. | |
| 6,003,182 A | 12/1999 | Song | 6,779,552 B1 | 8/2004 | Coffman | |
| 6,006,784 A | 12/1999 | Tsutsui et al. | 6,805,458 B2 | 10/2004 | Schindler et al. | |
| 6,019,130 A | 2/2000 | Rump | 6,845,526 B2 | 1/2005 | Malek et al. | |
| 6,026,844 A | 2/2000 | Laing et al. | 6,877,172 B2 | 4/2005 | Malek et al. | |
| 6,029,094 A | 2/2000 | Diffut | 6,892,952 B2 | 5/2005 | Chang et al. | |
| 6,032,616 A | 3/2000 | Jones | 6,895,985 B2* | 5/2005 | Popper et al. | 137/2 |
| 6,042,885 A | 3/2000 | Woollard et al. | 6,913,203 B2 | 7/2005 | DeLangis | |
| 6,059,192 A | 5/2000 | Zosimadis | 6,955,333 B2 | 10/2005 | Patterson et al. | |
| 6,061,499 A | 5/2000 | Hlebovy | 6,956,498 B1 | 10/2005 | Gauthier et al. | |
| 6,075,454 A | 6/2000 | Yamasaki | 6,962,162 B2 | 11/2005 | Acker | |
| 6,082,407 A | 7/2000 | Paterson et al. | 6,962,168 B2 | 11/2005 | McDaniel et al. | |
| 6,093,313 A | 7/2000 | Bovaird et al. | 6,964,404 B2 | 11/2005 | Patterson et al. | |
| 6,101,452 A | 8/2000 | Krall et al. | 6,964,405 B2 | 11/2005 | Marcichow et al. | |
| 6,132,085 A | 10/2000 | Bergeron | 6,968,860 B1 | 11/2005 | Haenlein et al. | |
| 6,167,845 B1 | 1/2001 | Decker, Sr. | 6,993,607 B2 | 1/2006 | Phillipp | |
| 6,175,689 B1 | 1/2001 | Blanco, Jr. | 7,025,077 B2 | 4/2006 | Vogel | |
| 6,182,683 B1 | 2/2001 | Sisk | 7,069,941 B2 | 7/2006 | Parsons et al. | |
| 6,192,192 B1 | 2/2001 | Illy et al. | 7,096,517 B2 | 8/2006 | Gubeli et al. | |
| 6,196,065 B1 | 3/2001 | Henksmeier et al. | 7,099,649 B2 | 8/2006 | Patterson et al. | |
| 6,202,980 B1 | 3/2001 | Vincent et al. | D528,991 S | 9/2006 | Katsuyama | |
| 6,220,297 B1 | 4/2001 | Marty et al. | 7,150,293 B2 | 12/2006 | Jonte | |
| 6,227,235 B1 | 5/2001 | Laing et al. | 7,174,577 B2 | 2/2007 | Jost et al. | |
| 6,240,250 B1 | 5/2001 | Blanco, Jr. | 7,232,111 B2 | 6/2007 | McDaniel et al. | |
| 6,250,558 B1 | 6/2001 | Dogre Cuevas | 7,295,190 B2 | 11/2007 | Philipp | |
| 6,250,601 B1 | 6/2001 | Kolar et al. | 7,537,195 B2 | 5/2009 | McDaniel et al. | |
| 6,273,394 B1 | 8/2001 | Vincent et al. | 7,690,395 B2 | 4/2010 | Jonte et al. | |
| 6,283,139 B1 | 9/2001 | Symonds et al. | 2001/0022352 A1 | 9/2001 | Rudrich | |
| 6,286,764 B1 | 9/2001 | Garvey et al. | 2001/0044954 A1 | 11/2001 | DiCarlo | |
| 6,288,707 B1 | 9/2001 | Philipp | 2002/0007510 A1 | 1/2002 | Mann | |
| 6,290,139 B1 | 9/2001 | Kolze | 2002/0015024 A1 | 2/2002 | Westerman et al. | |
| 6,290,147 B1 | 9/2001 | Bertrand et al. | 2002/0113134 A1 | 8/2002 | Laing et al. | |
| 6,294,786 B1 | 9/2001 | Marcichow et al. | 2002/0117122 A1 | 8/2002 | Lindner | |

| | | | |
|---|---|---|---|
| 2002/0148040 A1 | 10/2002 | Mateina | |
| 2002/0179723 A1 | 12/2002 | Wack et al. | |
| 2003/0001025 A1 | 1/2003 | Quintana | |
| 2003/0080194 A1 | 5/2003 | O'Hara et al. | |
| 2003/0088338 A1 | 5/2003 | Phillips et al. | |
| 2003/0089399 A1 | 5/2003 | Acker | |
| 2003/0125842 A1 | 7/2003 | Chang et al. | |
| 2003/0126993 A1 | 7/2003 | Lassota et al. | |
| 2003/0185548 A1 | 10/2003 | Novotny et al. | |
| 2003/0189108 A1 | 10/2003 | Bosio | |
| 2003/0201018 A1 | 10/2003 | Bush | |
| 2003/0213062 A1 | 11/2003 | Honda et al. | |
| 2003/0234769 A1 | 12/2003 | Cross et al. | |
| 2004/0011399 A1 | 1/2004 | Segien, Jr. | |
| 2004/0041033 A1 | 3/2004 | Kemp | |
| 2004/0041034 A1 | 3/2004 | Kemp | |
| 2004/0061685 A1 | 4/2004 | Ostergard et al. | |
| 2004/0088786 A1 | 5/2004 | Malek et al. | |
| 2004/0135010 A1 | 7/2004 | Malek et al. | |
| 2004/0144866 A1 | 7/2004 | Nelson et al. | |
| 2004/0149643 A1 | 8/2004 | Vandenbelt et al. | |
| 2004/0155116 A1 | 8/2004 | Wack et al. | |
| 2004/0195382 A1 | 10/2004 | Anderson et al. | |
| 2004/0204779 A1 | 10/2004 | Mueller et al. | |
| 2004/0206405 A1 | 10/2004 | Smith et al. | |
| 2004/0212599 A1 | 10/2004 | Cok et al. | |
| 2004/0255375 A1 | 12/2004 | Scarlata | |
| 2004/0262552 A1 | 12/2004 | Lowe | |
| 2005/0001046 A1 | 1/2005 | Laing | |
| 2005/0006402 A1 | 1/2005 | Acker | |
| 2005/0022871 A1 | 2/2005 | Acker | |
| 2005/0044625 A1 | 3/2005 | Kommers | |
| 2005/0082503 A1 | 4/2005 | Patterson et al. | |
| 2005/0086958 A1 | 4/2005 | Walsh | |
| 2005/0117912 A1 | 6/2005 | Patterson et al. | |
| 2005/0121529 A1* | 6/2005 | DeLangis | 236/12.12 |
| 2005/0125083 A1 | 6/2005 | Kiko | |
| 2005/0127313 A1 | 6/2005 | Watson | |
| 2005/0133100 A1* | 6/2005 | Bolderheij et al. | 137/801 |
| 2005/0146513 A1 | 7/2005 | Hill et al. | |
| 2005/0150552 A1 | 7/2005 | Forshey | |
| 2005/0150556 A1 | 7/2005 | Jonte | |
| 2005/0151101 A1 | 7/2005 | McDaniel et al. | |
| 2005/0167625 A1 | 8/2005 | Deen | |
| 2005/0194399 A1 | 9/2005 | Proctor | |
| 2005/0199841 A1 | 9/2005 | O'Maley | |
| 2005/0199843 A1 | 9/2005 | Jost et al. | |
| 2005/0236594 A1 | 10/2005 | Lilly et al. | |
| 2005/0273218 A1 | 12/2005 | Breed et al. | |
| 2006/0066991 A1 | 3/2006 | Hirano et al. | |
| 2006/0101575 A1 | 5/2006 | Louis | |
| 2006/0130907 A1 | 6/2006 | Marty et al. | |
| 2006/0130908 A1 | 6/2006 | Marty et al. | |
| 2006/0138246 A1 | 6/2006 | Stowe et al. | |
| 2006/0153165 A1 | 7/2006 | Beachy | |
| 2006/0186215 A1 | 8/2006 | Logan | |
| 2006/0200903 A1 | 9/2006 | Rodenbeck et al. | |
| 2006/0201558 A1 | 9/2006 | Marty et al. | |
| 2006/0202142 A1 | 9/2006 | Marty et al. | |
| 2006/0212016 A1 | 9/2006 | Lavon et al. | |
| 2006/0214016 A1* | 9/2006 | Erdely et al. | 236/12.12 |
| 2006/0231638 A1 | 10/2006 | Schmitt et al. | |
| 2006/0231788 A1 | 10/2006 | Cheng | |
| 2006/0238428 A1 | 10/2006 | Schmitt et al. | |
| 2006/0238513 A1 | 10/2006 | Phillip | |
| 2006/0283511 A1 | 12/2006 | Nelson | |
| 2007/0001018 A1 | 1/2007 | Schmitt et al. | |
| 2007/0057215 A1 | 3/2007 | Parsons et al. | |
| 2007/0069168 A1 | 3/2007 | Jonte | |
| 2007/0069169 A1* | 3/2007 | Lin | 251/129.04 |
| 2007/0157978 A1 | 7/2007 | Jonte et al. | |
| 2007/0170384 A1* | 7/2007 | Goodman | 251/129.04 |
| 2007/0235672 A1 | 10/2007 | McDaniel et al. | |
| 2007/0246267 A1 | 10/2007 | Koottungal | |
| 2007/0246550 A1 | 10/2007 | Rodenbeck et al. | |
| 2007/0246564 A1 | 10/2007 | Rodenbeck et al. | |
| 2008/0178950 A1 | 7/2008 | Marty et al. | |
| 2008/0178957 A1 | 7/2008 | Thomas et al. | |
| 2008/0189850 A1 | 8/2008 | Seggio et al. | |
| 2008/0203195 A1 | 8/2008 | Schmitt | |
| 2008/0271238 A1 | 11/2008 | Reeder et al. | |
| 2009/0039176 A1 | 2/2009 | Davidson et al. | |
| 2009/0056011 A1* | 3/2009 | Wolf et al. | 4/623 |
| 2010/0012194 A1 | 1/2010 | Jonte et al. | |
| 2010/0065764 A1* | 3/2010 | Canpolat | 251/129.04 |
| 2010/0096017 A1 | 4/2010 | Jonte et al. | |
| 2010/0294641 A1 | 11/2010 | Kunkel | |

FOREIGN PATENT DOCUMENTS

| | | |
|---|---|---|
| DE | 04401637 | 5/1998 |
| DE | 19815324 | 11/2000 |
| EP | 0961067 B1 | 4/1999 |
| JP | 63111383 | 10/1986 |
| JP | 00073426 | 12/1998 |
| JP | 2003-20703 A | 1/2003 |
| JP | 2003105817 | 4/2003 |
| JP | 2003293411 | 10/2003 |
| JP | 2004-092023 | 3/2004 |
| JP | 2005-146551 A | 6/2005 |
| KR | 10-1997-0700266 | 1/1997 |
| KR | 10-2003-0008144 | 1/2003 |
| KR | 10-2003-0077823 | 10/2003 |
| KR | 20-0382786 Y1 | 4/2005 |
| WO | WO 91/17377 | 11/1991 |
| WO | WO 01/20204 | 3/2001 |
| WO | WO 04/001142 | 12/2003 |
| WO | WO 2004/094990 | 11/2004 |
| WO | WO 2005/057086 | 6/2005 |
| WO | WO 2006/136256 | 12/2006 |
| WO | WO 2007/059051 | 5/2007 |
| WO | WO 2007/082301 | 7/2007 |
| WO | WO 2008/094651 | 8/2008 |

OTHER PUBLICATIONS

Camacho et al., Freescale Semiconductor, "Touch Pad System Using MC34940/MC33794 E-Field Sensors," Feb. 2006, 52 pgs.
Hego WaterDesign, "Touch Faucets—Amazing Futuristic Faucet Designs," Oct. 6, 2009, 3 pgs.
Quantum Research Group, "E401 User Manual," at least as early as Oct. 22, 2007, 15 pgs.
Quantum Research Group, "Gorenje Puts QSlide™ Technology into Next-Generation Kitchen Hob," Feb. 8, 2006, http://www.qprox.com/news/gorenje.php, 3 pgs.
Quantum Research Group, "Qprox™ Capacitive Touch Applications," © 2005, http://www.qprox.com/background/applications.php, 8 pgs.
Quantum Research Group, "QT401 QSlide™ Touch Slider IC," 2004, 16 pgs.
Quantum Research Group, "QT411-ISSG QSlide™ Touch Slider IC," 2004-2005, 12 pgs.
Sequine et al., Cypress Perform, "Application Notes AN2292," Oct. 31, 2005, 15 pgs.
Sequine et al., Cypress Perform, "Application Notes AN2233a," Apr. 14, 2005, 6 pgs.
Sloan® Optima® i.q. Electronic Hand Washing Faucet, Apr. 2004, 2 pgs.
Symmons, Ultra-Sense, Battery-Powered Faucets with PDS and Ultra-Sense AC Powered Faucets, © 1999-2004, 2 pgs.
Symmons®, "Ultra-Sense® Sensor Faucets with Position-Sensitive Detection," Aug. 2004, 4 pgs.
Symmons® Commercial Faucets: Reliability With a Sense of Style, at least as early as Jan. 4, 2006, 1 pg.
Symmons®, "Ultra-Sense® Battery-Powered, Sensor-Operated Lavatory Faucet S-6080 Series," Oct. 2002, 4 pgs.
Symmons®, "Ultra-Sense® Sensor Faucets with Position-Sensitive Detection," © 2001-2002, 2 pgs.
Technical Concepts International, Inc., Capri AutoFaucet® with Surround Sensor™ Technology, 500556, 500576, 500577, Aug. 2004, 1 pg.
Technical Concepts, AutoFaucet® with "Surround Sensor" Technology, Oct. 2005, 4 pgs.
Toto® Products, "Self-Generating EcoPower System Sensor Faucet, Standard Spout," Specification Sheet, Nov. 2002, 2 pgs.

Various Products (available at least before Apr. 20, 2006), 5 pgs.
Zurn® Plumbing Products Group, "AquaSense® Sensor Faucet," Jun. 9, 2004, 2 pgs.
Zurn® Plumbing Products Group, "AquaSense® Z6903 Series", Installation, Operation, Maintenance and Parts Manual, Aug. 2001, 5 pgs.
KWC Armaturen, "Kitchen faucet," 802285 installation and service instructions, Jul. 2005, 8 pgs.

Dave Van Ess, Capacitive Sensing Builds a Better Water-Cooler Control, Cypress Semiconductor Corp., Nov. 2007.
Aviation Faucet System, Product Brochure, Franke Aquarotter GmbH, downloaded Oct. 1, 2012.
Springking Industry Col, Limited, Touch Sensor Faucet, Product Specification, copyright 2010 downloaded Oct. 1, 2012.

* cited by examiner

USER INTERFACE FOR A FAUCET

CROSS-REFERENCE TO RELATED APPLICATIONS

This application is a continuation-in-part of U.S. patent application Ser. No. 11/700,556 now U.S. Pat. No. 8,118,240, filed Jan. 31, 2007, titled "PULL-OUT WAND," which claims priority to U.S. Provisional Patent Application Ser. No. 60/794,229, filed Apr. 20, 2006, is a continuation-in-part of U.S. patent application Ser. No. 11/737,727 now U.S. Pat. No. 8,162,263, filed Apr. 19, 2007, titled "ELECTRONIC USER INTERFACE FOR ELECTRONIC MIXING OF WATER FOR RESIDENTIAL FAUCETS," which claims priority to U.S. Provisional Patent Application Ser. No. 60/794,229, filed Apr. 20, 2006, the disclosures of which are expressly incorporated by reference herein.

BACKGROUND AND SUMMARY OF THE INVENTION

The present invention relates generally to water delivery systems, such as faucets, and more particularly to user inputs for faucets.

Faucets have traditionally been controlled by a manual user input, such as a single handle which is coupled to a mixing valve to proportion the flow of hot and cold water to a delivery spout, or two handles which utilize two separate valves to control the flow of hot and cold water. Typically, a user operates either the single handle or the two handles to regulate the flow of hot water and cold water, and hence both the flow rate and the temperature of a mixed water. Additionally, electronic user interfaces are known to control actuation of one or more valves to control the flow of mixed water through a delivery spout.

According to an illustrative embodiment of the present disclosure, a water delivery system includes at least one valve in fluid communication with a cold water source and a hot water source, the at least one valve including at least one actuator. An outlet is in fluid communication with the at least one valve, and a controller is operably coupled to the at least one actuator. An electronic user interface includes a first touch slider user input operably coupled to the controller, wherein the controller is configured to control the at least one valve such that the at least one valve delivers a desired flow rate of water to the outlet based upon the first touch slider user input. A second touch slider user input is operably coupled to the controller, wherein the controller is configured to control the at least one valve such that the at least one valve delivers a desired temperature of water to the outlet based upon the second touch slider user input. An indicator is operably coupled to the controller and is configured to provide an indication of the desired flow rate of water and the desired temperature of water.

According to another illustrative embodiment of the present disclosure, an electronic user interface for a water delivery device includes a first user input to control the flow rate of water delivered to an outlet, and a second user input to control the temperature of water delivered to an outlet. An indicator includes a colored light source, wherein the light source changes the magnitude of light emitted based upon the flow rate selected by the first user input and the light source changes the color of light emitted depending upon the temperature selected by the second user input.

According to a further illustrative embodiment of the present disclosure, an apparatus for controlling the provision of water above a sink deck from a source of cold water and a source of hot water includes a mixing valve in fluid communication with the source of cold water and the source of hot water, the mixing valve being located beneath the sink deck. An electronic user interface is located above the sink deck, and a spout is in fluid communication with an outlet of the mixing valve. A controller is operably coupled to the electronic user interface and to the mixing valve, wherein the electronic user interface includes a first touch slider user input for setting a desired water temperature and a second touch slider user input for setting a desired flow rate. The electronic user interface further includes a plurality of preset task inputs, and an indicator configured to provide an indication of the desired water temperature and the desired flow rate.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments elected for description have been chosen to enable one skilled in the art to practice the invention. Although the disclosure is described in connection with water, it should be understood that additional types of fluids may be used.

Figure 1:
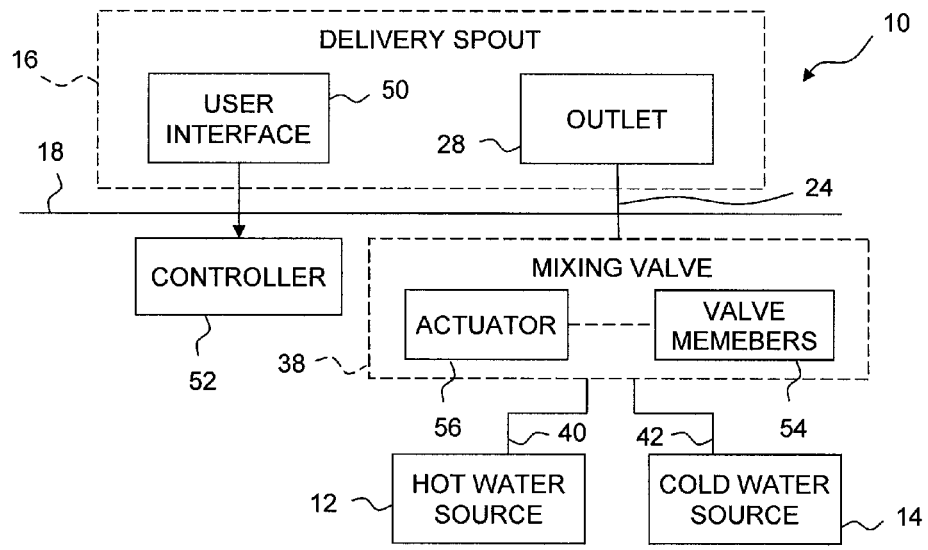
FIG. 1 is a diagrammatic representation of an illustrative embodiment water delivery device.

Referring initially to FIG. 1, a diagrammatic representation of a water delivery device 10 is shown. In the illustrative embodiment, the water delivery device 10 is fluidly coupled to a hot water source 12 and a cold water source 14. The water delivery device 10 illustratively includes a delivery spout 16 coupled to and supported above a mounting deck 18. Illustrative mounting decks 18 include a countertop, a sink top, a tub, a wall, and other suitable mounting structures.

Figure 2:
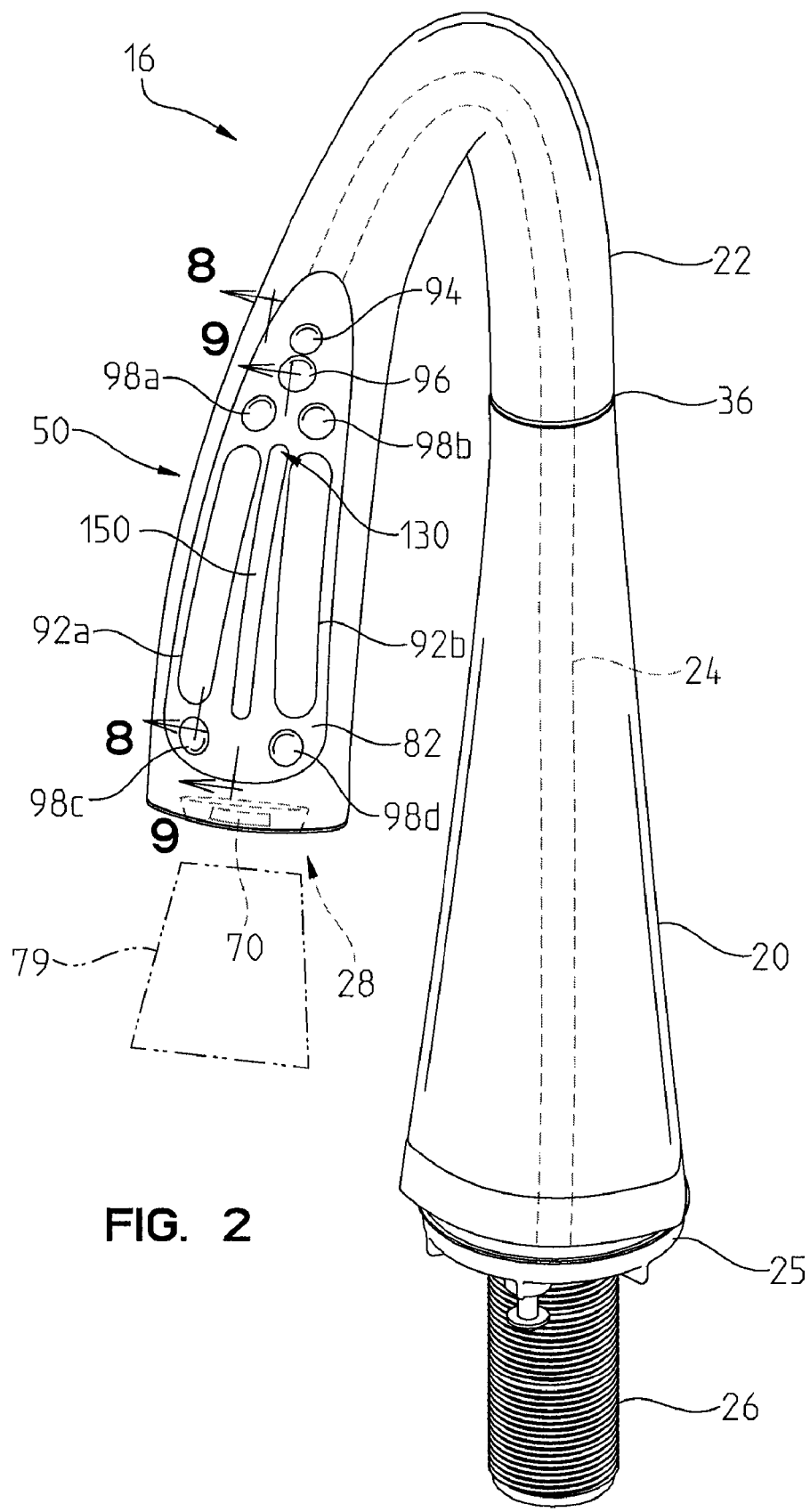
FIG. 2 is a perspective view of an illustrative embodiment delivery spout of the water delivery device of FIG. 1.
Figure 4:
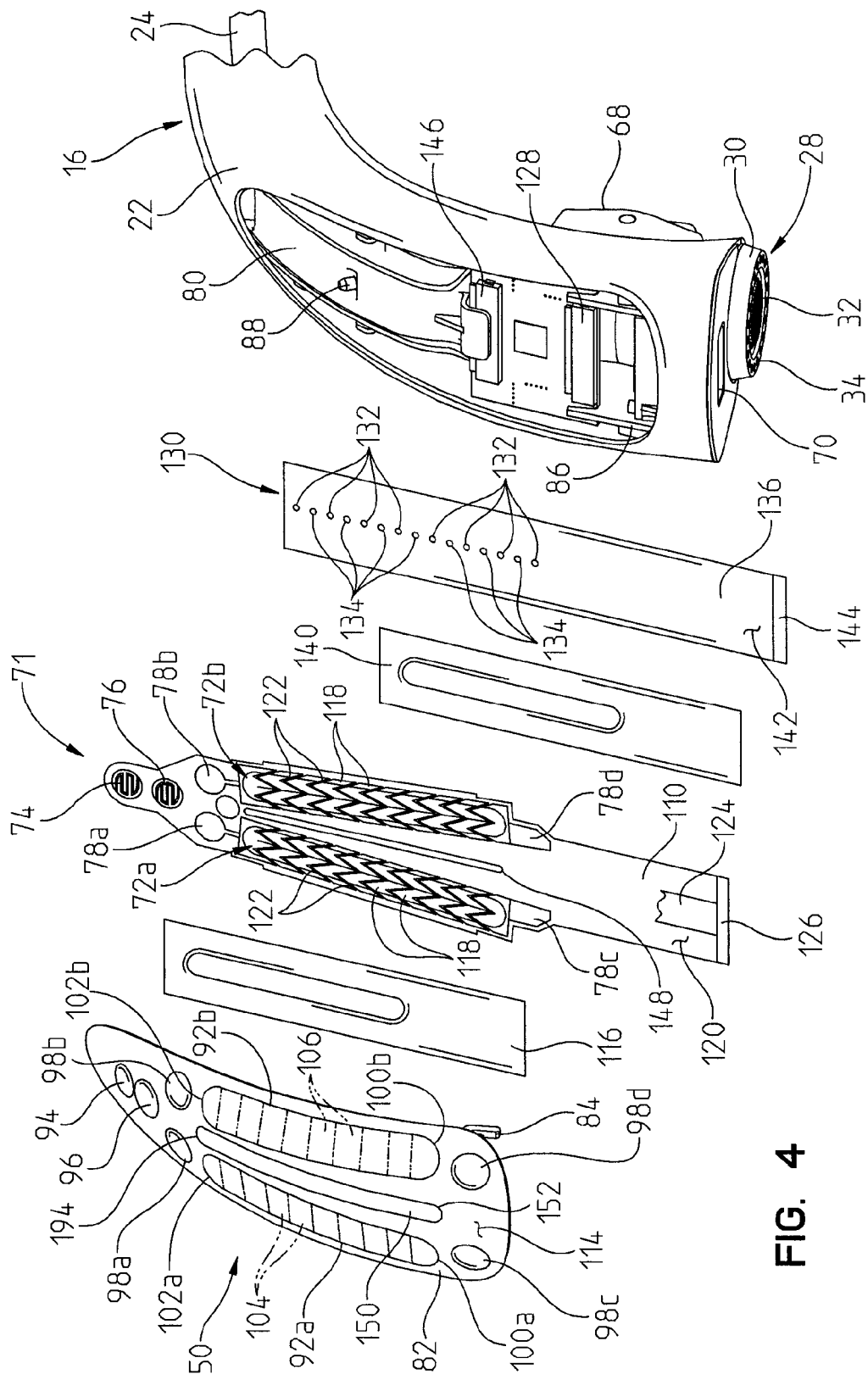
FIG. 4 is an exploded perspective view of the user interface of FIG. 2.

In one illustrative embodiment, the water delivery device 10 is a residential kitchen faucet and the mounting deck 18 is one of a countertop or sink. As shown in FIG. 2, the delivery spout 16 includes a base portion 20 and an outlet portion 22. Both the base portion 20 and the outlet portion 22 are tubular members defining a passageway extending therethrough for receiving at least one tubular waterway 24. The base portion 20 includes a coupler, such as a threaded nut 25 engaging a tubular mounting shank 26 for securing the delivery spout 16 to the mounting deck 18. The outlet portion 22 supports an outlet 28, illustratively in a spray head member 30 including a central output 32 and a second, surrounding output 34 (FIG. 4). In one illustrative embodiment, the outlet portion 22 may swivel or rotate relative to the base portion 20 about a swivel coupling 36. In a further illustrative embodiment, the outlet portion 22 may include a pull-out wand portion of the type disclosed in U.S. patent application Ser. No. 11/700,556, Publication No. 2007/0246564, titled "PULL-OUT WAND," the disclosure of which has been expressly incorporated by reference herein.

Base portion 20 of the delivery spout 16 is coupled to the mounting deck 18, while the outlet portion 22 is supported by the base portion 20. In the illustrative embodiment, the waterway 24 extends through the delivery spout 16 and is in fluid communication with a mixing valve 38 (FIG. 1). The mixing valve 38 is in fluid communication with the hot water source 12 and the cold water source 14 through waterways 40 and 42, respectively. Based upon input provided by a user interface 50 to a controller 52, the mixing valve 38 regulates the temperature and/or flow rate of water supplied to the waterway 24 of delivery spout 16.

In the illustrative embodiment of FIG. 1, the mixing valve 38 provides water on/off control, water flow regulation, and water temperature regulation. In one illustrative embodiment, the mixing valve 38 is comprised of multiple valve members 54 coupled to at least one actuator 56 and which together provide on/off control, water flow regulation, and/or water temperature regulation. Exemplary valves are detailed in U.S. patent application Ser. No. 11/737,727, Publication No. 2007/0246550, titled "ELECTRONIC USER INTERFACE FOR ELECTRONIC MIXING OF WATER FOR RESIDENTIAL FAUCETS," the disclosure of which has been expressly incorporated by reference herein. While the illustrated embodiment shows a single mixing valve 38, it should be appreciated that separate valves may be fluidly coupled to the hot water source 12 and the cold water source 14 to provide similar water on/off control, water flow regulation, and/or water temperature regulation. Illustrative valves are detailed in U.S. patent application Ser. No. 11/109,281, Publication No. 2006/0231638, titled "ELECTRONIC PROPORTIONING VALVE," the disclosure of which is expressly incorporated by reference herein.

Figure 3:
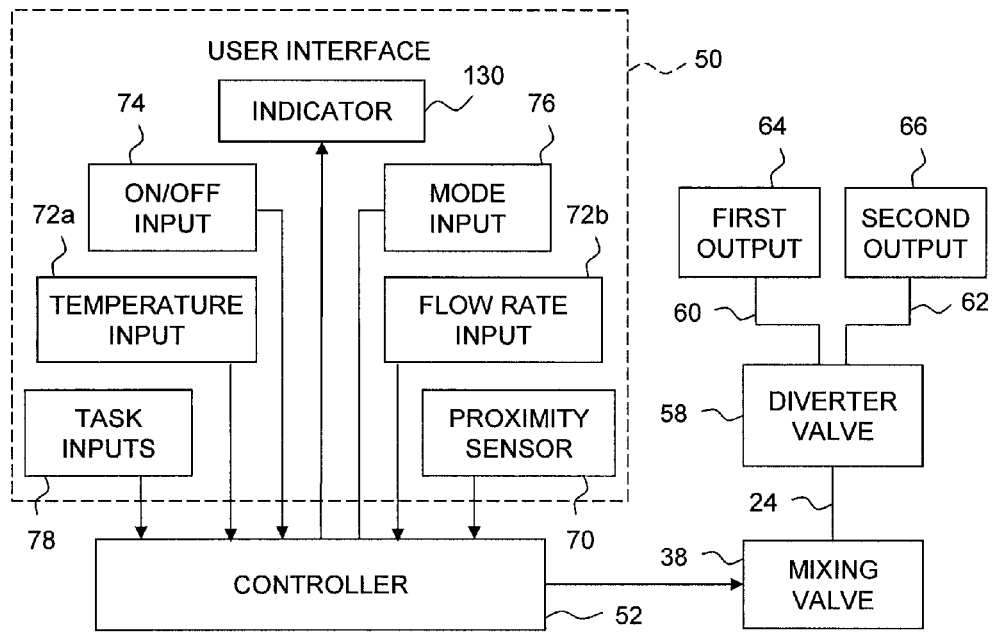
FIG. 3 is a diagrammatic representation of an illustrative user interface operably coupled to a controller for controlling the temperature and flow rate of water delivered by a mixing valve to a diverter valve.

The mixing valve 38 and the controller 52 are illustratively positioned on opposite sides of the mounting deck 18 as the base portion 20 and the outlet portion 22 of the delivery spout 16. In one illustrative embodiment, both the mixing valve 38 and the controller 52 are positioned on the same side of mounting deck 18 as the base portion 20. In a further illustrative embodiment, one or both of the mixing valve 38 and the controller 52 are incorporated into one of the base portion 20 and the outlet portion 22 of the delivery spout 16. In another illustrative embodiment, the controller 52 includes a first controller positioned in the outlet portion 22 of the delivery spout 16 and a second controller positioned in one of the base portion 20 and on an opposite side of the mounting deck 18. The first controller positioned in the outlet portion 22 interfaces with sensors included in the outlet portion 22, such as a temperature input 72a, a flow rate input 72b and/or a proximity sensor 70 (FIG. 3). The second controller positioned in the base portion 20 or on the opposite side of the mounting deck 18 interfaces with the mixing valve 38. The first controller and the second controller may be in communication with each other through either a wired or wireless connection. In a wireless connection, such as radio frequency (RF), the outlet portion 22 includes a battery to power the first controller.

Illustratively, the user interface 50 indirectly interacts with the mixing valve 38, such as by providing one or more inputs to the controller 52. Referring to FIG. 3, a diagrammatic representation of an illustrative embodiment of the user interface 50 is shown in communication with the controller 52 for controlling mixing valve 38. The mixing valve 38 may be in fluid communication with a diverter valve 58 via the waterway 24. Illustratively, the waterway 24 may be made of a cross-linked polyethylene (PEX) material. However, the waterway 24 and any of the additional waterways disclosed herein may be made of other materials, including metals or polymers. For example, waterway 24 may be formed of a polyethylene (PE), polypropylene (PP) or polybutylene (PB). It is further envisioned that the waterway 24 and any of the additional waterways disclosed herein could be formed of cross-linked polyvinylchloride (PVCX) using silene free radical initiators, from cross-linked polyurethane, or cross-linked propylene (XLPP) using peroxide or silene free radical initiators.

The diverter valve 58 is in fluid communication with two waterways 60 and 62 which are in fluid communication with a first output 64 and a second output 66, respectively, defined by the central output 32 and the surrounding output 34 of the spray head member 30 (FIG. 4). In one illustrative embodiment, the first output 64 defined by the central output 32 is configured to provide water in a stream configuration and the second output 66 defined by the surrounding output 34 is configured to provide water in a spray configuration.

As is known in the art, a diverter valve diverts the flow of a fluid from one of a plurality of potential fluid outlets based upon the configuration of the valve. By adjusting the configuration of the valve, the fluid outlet to which fluid is provided may be selected. Illustratively, the diverter valve 58 is a manual diverter valve including a rocker or toggle switch 68 (FIG. 4) configured to switch between the waterways 60 and 62 and the first and second outputs 64 and 66, respectively, in response to manual input from a user. The manual diverter valve 58 may be replaced with an electronically controller diverter valve, typically including a solenoid valve.

With further reference to FIG. 3, the user interface 50 includes a plurality of sensors operably coupled to the controller 52, through either a wired or wireless connection. In one illustrative embodiment, one or more of the sensors provide an indication of the presence of an object, such as a user's hands or other presentments, in a detection zone. Further, in an illustrative embodiment, one or more of the sensors detect the presence of touch by a user.

In the illustrative embodiment of FIGS. 3 and 4, the sensors include proximity sensor 70 and a plurality of touch sensors 72a, 72b, 74, 76, and 78. The proximity sensor 70 may be of conventional design as including an IR emitter which emits IR energy into a detection zone 79 and an IR detector which receives reflected IR energy from the detection zone 79 (FIG.

2). When an object, such as a user's hands, is detected in the detection zone 79, due to the amount of IR energy received by the IR detector, the proximity sensor 70 provides an indication thereof to the controller 52. In one illustrative embodiment, the controller 52 monitors a voltage corresponding to the IR level detected by the IR detector to determine whether user's hands are present in the detection zone 79. In another illustrative embodiment, the proximity sensor 70 is a capacitive proximity sensor. In one example, the range of the capacitive proximity sensor (i.e. detection zone 79) is about three inches from the outlet 28.

As further detailed herein, each touch sensor 72, 74, 76, 78 monitors a region of the user interface 50 supported by the outlet portion 22 and provides an indication to the controller 52 of a user touching that region. In one illustrative embodiment, touch sensors 72, 74, 76, 78 are capacitive sensors wherein the controller 52 monitors each capacitive touch sensor 72, 74, 76, 78 to determine when the user touches the region corresponding to the respective touch sensor 72, 74, 76, 78.

Referring now to FIGS. 2 and 4, illustrative user interface 50 is shown supported by the outlet portion 22 of the delivery spout 16. The user interface 50 includes a housing 80 received within the outlet portion 22 and supporting a removable cover 82. A lower end of the cover 82 includes a pair of hooks 84 which are coupled to anchors or pegs 86 of the housing 80. A fastener, such as a screw 88, may be used to couple the upper end of the cover 82 to the housing 80. The proximity sensor 70 is illustratively oriented downwardly from the housing 80. The spray head member 30 is fluidly coupled to the waterway 24 and may be removably docked with the bottom of the housing 80 in instances where the spray head member 30 forms part of a pull-out wand of the outlet portion 22. The spray head member 30 may be secured in a docked position through various means, such as a magnet or a bayonet coupling.

In one illustrative embodiment, the housing 80 and cover 82 are made of non-metallic material. Such illustrative non-metallic materials include polymers, for example thermoplastic or thermoset materials, such as polyesters, melamine, melamine urea, melamine phenolic, and phenolic.

As noted above, the proximity sensor 70 monitors detection zone 79 positioned on or below the end face of the outlet portion 22 of delivery spout 16. In one illustrative embodiment, the proximity sensor 70 is oriented to monitor a different detection zone 79, such as forward of, or forward and downward of, the outlet portion 22.

With further reference to FIGS. 3 and 4, the user interface 50 includes a touch sensor assembly 71 having a plurality of touch sensors 72a 72b, 74, 76, 78. Touch sensors 72a, 72b are slide sensors which monitor the position of a user's finger along a corresponding region 92a, 92b of the cover 82, respectively. Touch sensors 74, 76, 78a, 78b, 78c, 78d illustratively monitor regions 94, 96, 98a, 98b, 98c, 98d of cover 82, respectively.

Regions 92a, 92b associated with sensors 72a, 72b extend between opposing lower and upper ends 100a, 100b and 102a, 102b, respectively. A plurality of segments 104, 106 extend between the ends 100a, 100b and 102a, 102b of the regions 92a, 92b, respectively. While ten different segments 104, 106 are illustrated in FIG. 4 for each region 92a, 92b, it should be appreciated that the number may vary depending upon the application of the respective sensors 72a, 72b. Moreover, in certain embodiments, the regions 92a, 92b may be continuously variable between lower and upper ends 100a, 100b, and 102a, 102b.

A user may adjust the desired temperature by touching one of the segments 104 within region 92a associated with the sensor 72a. By touching a segment 104 closer to the lower end 100a, a lower temperature is selected, while touching a segment 104 closer to the upper end 102 selects a higher temperature. A user may simply touch a segment 104 of region 92a corresponding to the desired temperature, or may contact a different segment 104 and drag the finger to the segment 104 corresponding to the desired temperature.

A user may adjust the desired flow rate by touching one of the segments 106 within region 92b associated with the sensor 72b. By touching a segment 106 closer to the lower end 100b, a lower flow rate is selected. Similarly, by touching a segment 106 closer to the upper end 102b, a higher flow rate is selected. A user may simply touch a segment 106 of region 92b corresponding to the desired flow rate, or may contact a different segment 106 and drag the finger to the segment 106 corresponding to the desired flow rate. The selected temperature and flow rate from sensors 72a and 72b, respectively, are communicated to the controller 52 which adjusts mixing valve 38 to provide the desired temperature and flow rate.

Sensors 74, 76, and 78 illustratively have predefined functions defined by the controller 52. Illustratively, when a user touches the region 94 associated with sensor 74, the controller 52 either turns on (activates) or turns off (deactivates) the water flow through the outlet 28 by controlling mixing valve 38. Subsequent touches of region 94 successively deactivates and activates (i.e., toggles) the water flow through mixing valve 38. Further illustratively, when a user touches the region 96 associated with sensor 76, the controller 52 turns on (activates) and turns off (deactivates) the proximity sensor 70.

Sensors 78a, 78b, 78c, 78d and associated regions 98a, 98b, 98c, 98d define preset or task buttons that may permit a user to rapidly switch between different tasks, such as from a hot water task like washing pots and pans to a cold water task like obtaining drinking water. Illustratively, the user may make adjustments to the water characteristics defined by a preset by selecting a different temperature with region 92a and/or selecting a different flow rate with region 92b. In one illustrative embodiment, the task sensors 78a, 78b, 78c, 78d are adjustable by the user such that the user may provide customized characteristics for a given sensor 78a, 78b, 78c, 78d.

In one illustrative embodiment, the cover 82 may include indicia (not shown) to indicate to a user the location of the touch regions 92a, 92b, 94, 96, 98a, 98b, 98c, 98d and a function associated with each corresponding sensor 72a, 72b, 74, 76, 78a, 78b, 78c, 78d. The function corresponds to the actions taken by the controller 52 based on the detection of the touch by the user. Examples of input indicia and the corresponding action taken by the controller relative to a mixing valve and/or diverter valve are provided in U.S. patent application Ser. No. 11/737,727, filed Apr. 18, 2007, titled "ELECTRONIC USER INTERFACE FOR ELECTRONIC MIXING OF WATER FOR RESIDENTIAL FAUCETS," the disclosure of which has been expressly incorporated by reference herein.

Figure 8:
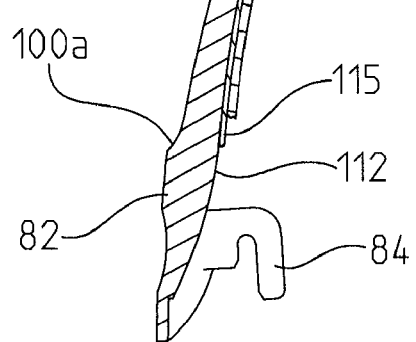
FIG. 8 is a cross-sectional view taken along line 8-8 of FIG. 2

As stated above, the sensors 72a, 72b are illustratively slide touch sensors. As shown in FIGS. 4 and 8, sensors 72a and 72b are both illustratively supported on a common base member 110. Touch sensor 72b is substantially the same as touch sensor 72a. As such, the following discussion relative to touch sensor 72a is equally applicable to touch sensor 72b.

The base member 110 supporting sensors 72a and 72b is illustratively formed of an electrically insulating, flexible material, such as Mylar®. While the base member 110 in FIG. 4 is shown to be in a substantially planar configuration, upon assembly within the user interface 50, the base member 110 conforms to a non-linear profile similar to that shown in FIG. 8 by adhering to the curved inner surface 112 of the cover 82. The inner surface 112 illustratively follows the general curvature of the outer surface 114 of the cover 82 which, in turn, is configured to conform to the shape of the outlet portion 22 of the delivery spout 16. An adhesive member 116, such as a double-faced adhesive tape, is used to adhere the base member 110 to the inner surface 112 of the cover 82.

Figure 10:
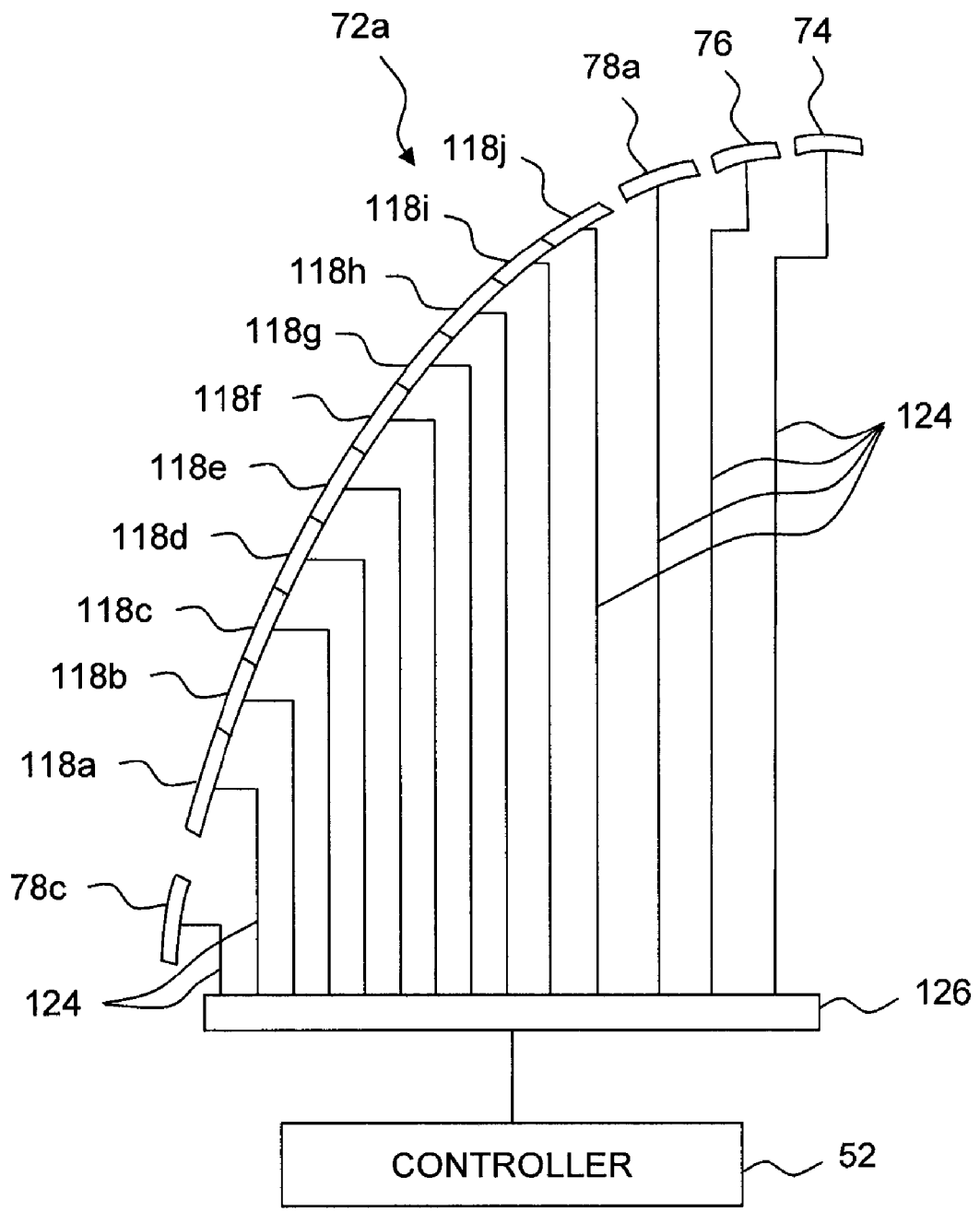
FIG. 10 is a schematic representation of touch sensors of FIG. 4.

With reference to FIGS. 4 and 10, the touch sensor 72a includes a plurality of contacts 118 that define the segments 104 of region 92a. The contacts 118 are illustratively formed by an electrically conductive material, such as copper applied to an outer surface 120 of the base member 110. Each contact 118 is electrically separated from an adjacent contact by a boundary 122. The boundaries 122 are illustratively formed in a saw tooth pattern such that a touch by a user bridging adjacent contacts 118 may be proportioned between such adjacent contacts 118. Illustratively, circuitry of controller 52 interpreting input from the sensors 72a, 72b may be manufactured by Cypress of San Jose, Calif.

The sensors 74, 76, and 78 are also illustratively formed by an electrically conductive material, such as copper, applied to the outer surface 120 of the base member 110. With reference to FIG. 10, traces or connecting paths 124 are also illustratively formed of an electrically conductive material, such as copper, and are electrically coupled to the contacts 118 of sensors 72a, 72b, and the sensors 74, 76, 78a, 78b, 78c, 78d. More particularly, the traces 124 provide electrical communication between the sensors 72a, 72b, 74, 76, 78a, 78b, 78c, 78d and a connector 126. The connector 126 is illustratively electrically coupled to a receptacle 128 within the housing 80 of the user interface 50 which, in turn, is electrically coupled to the controller 52.

With reference to FIGS. 3 and 4, indicator 130 is also provided within the user interface 50. More particularly, the indicator 130 includes a plurality of light sources 132 and 134, illustratively light emitting diodes (LEDs), supported on a base member 136, illustratively a printed circuit board. The base member 136 may be formed of an electrically insulating, flexible material, such as Mylar®.

Figure 9:
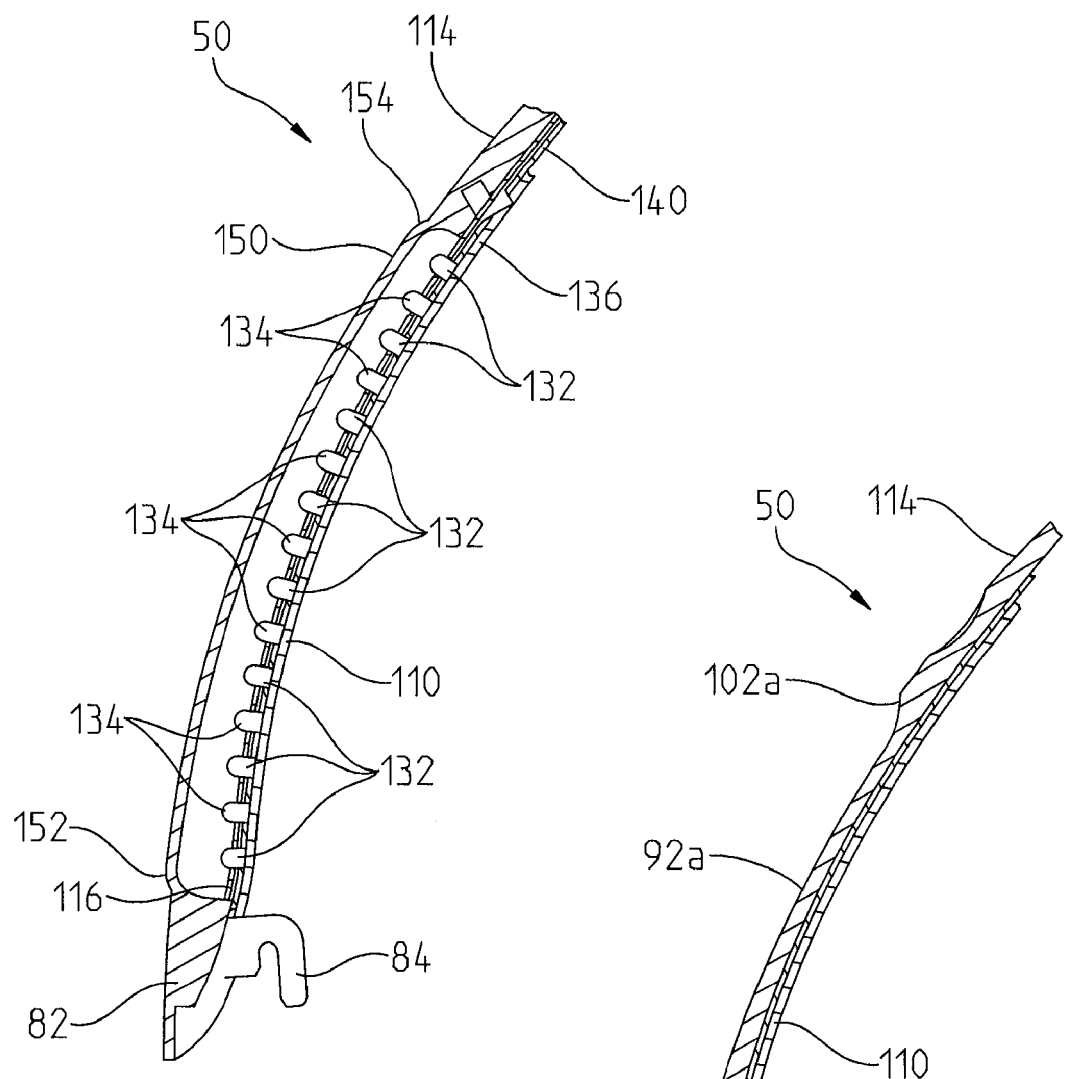
FIG. 9 is a cross-sectional view taken along line 9-9 of FIG. 2.

While the base member 136 in FIG. 4 is shown to be in a substantially planar configuration, upon assembly within the user interface 50, the base member 136 conforms to a non-linear profile similar to that shown in FIG. 9 by adhering to the curved inner surface 138 of the base member 110 of the touch sensor assembly 71. More particularly, an adhesive member 140, such as double-faced adhesive tape, is used to adhere the outer surface 142 of the base member 136 to the inner surface 138 of the base member 110. A connector 144 is illustratively in electrical communication with the light sources 132, 134. The connector 144 is configured to be electrically coupled to a receptacle 146 within the user interface 50 (FIG. 4) which, in turn, is electrically coupled to the controller 52.

In one illustrative embodiment, the light sources 132 and 134 are surface mount LEDs available from Liteon of Milpitas, Calif. The LEDs 132, 134 are illustratively received within a slot 148 formed within the base member 110 of the touch sensor assembly 71. A window 150 is formed within the cover 82 and extends between lower and upper ends 152 and 154. The window 150 permits light generated by the indicator 130 to be visible from the exterior of the cover 82. Illustratively, the indicator 130 indicates a selected parameter of one or both of the sensors 72a, 72b. In one illustrative embodiment, the indicator 130 displays a current value of the parameter controlled by the input to sensor 72a. In a further illustrative embodiment, the indicator 130 indicates a current value of the parameter controlled by sensor 72b. In yet another illustrative embodiment, as further detailed herein, the indicator 130 indicates current values of the parameters controlled by both sensors 72a and 72b.

As shown in the illustrative embodiment of FIG. 4, the LEDs 132 are interspaced with the LEDs 134. Illustratively, LEDs 132 are configured to emit a blue color, while LEDs 134 are configured to emit a red color. By varying the number of blue LEDs 132 illuminated relative to the number of red LEDs 134 illuminated, the displayed color changes. As further detailed below, the ratio of LEDs 132 illuminated relative to LEDs 134 (i.e., color) indicates the value of the parameter (e.g. temperature) controlled by sensor 72a, while the total number of combined LEDs 132 and 134 illuminated (i.e., magnitude or light level) indicates the value of the parameter (e.g. flow rate) controlled by sensor 72b.

While longitudinally-spaced apart blue and red LEDs 132 and 134 are illustrated, it should be appreciated that variations may be substituted therefor. For example, each blue LED 132 may be spaced laterally adjacent a red LED 134, wherein a plurality of these laterally spaced combinations of blue and red LEDs 132 and 134 are longitudinally spaced apart from each other. In yet another illustrative embodiment, separate blue and red LEDs 132 and 134 may be replaced by a plurality of bi-color LEDs.

Figure 5:
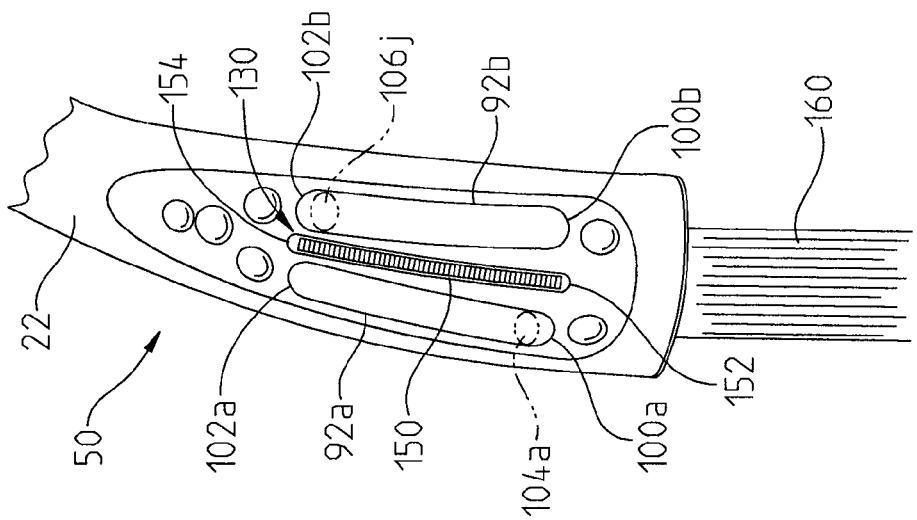
FIG. 5 is a perspective view of the user interface of FIG. 2, showing a full hot temperature selection at the first touch slider user input, a low flow selection at the second touch slider user input, and a corresponding visual indication by the indicator.
Figure 6:
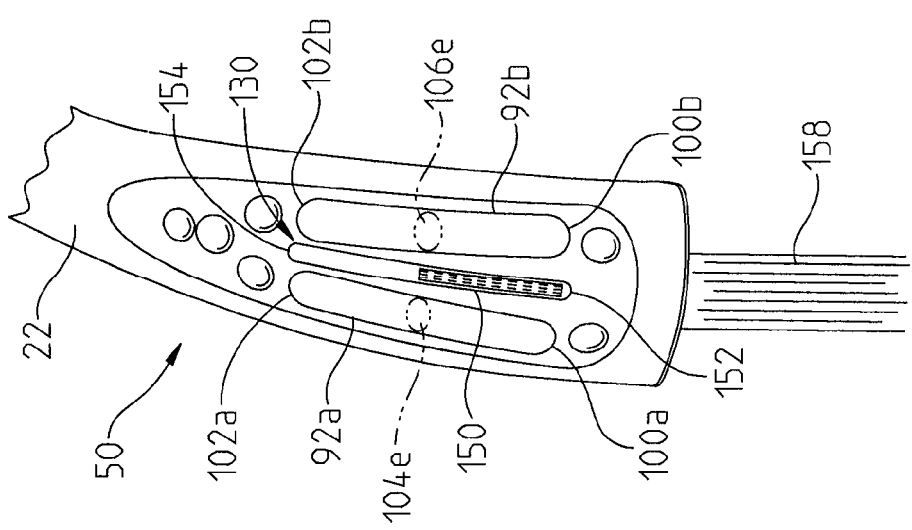
FIG. 6 is a perspective view of the user input similar to FIG. 5, showing a mixed temperature selection at the first touch slider user input, a medium flow selection at the second touch slider user input, and a corresponding visual indication by the indicator.
Figure 7:
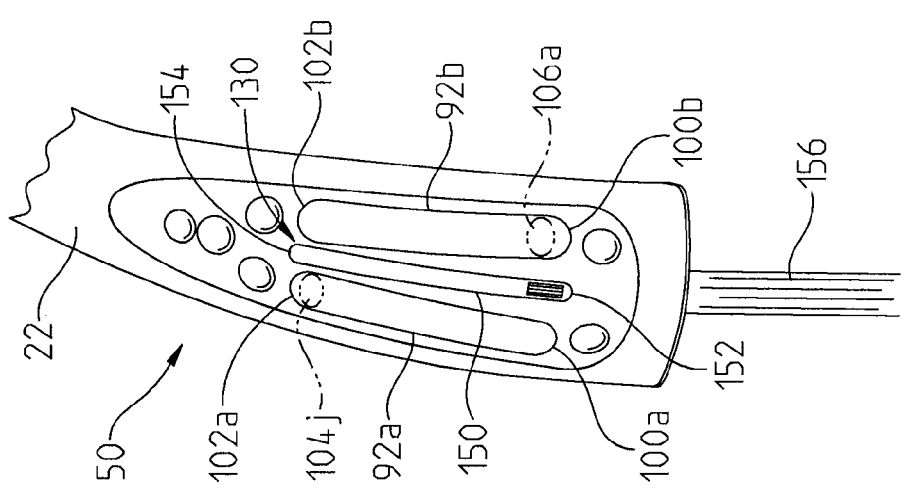
FIG. 7 is perspective view of the user interface similar to FIG. 5, showing a full cold temperature selection at the first touch slider user input, a full flow selection at the second touch slider user input, and a corresponding visual indication by the indicator.

In the illustrative embodiment as shown in FIGS. 5-7, the indicator 130 provides a combined indication of parameters (e.g. temperature and flow rate) controlled by both sensors 72a and 72b through user input to regions 92a and 92b, respectively. In the illustrative embodiment detailed herein, input to region 92a and first sensor 72a controls temperature, while input to region 92b and second sensor 72b controls flow rate.

A hot water, low flow condition is represented by the indicator 130 in FIG. 5. More particularly, a user contacts segment 104j of region 92a corresponding to contact 118j of sensor 72a, thereby instructing the controller 52 that the greatest value of the applicable parameter (i.e., temperature) is requested. When a user contacts segment 106a of region 92b corresponding to contact 118a of sensor 72b, the controller 52 is instructed that the lowest value of the applicable parameter (i.e., flow rate) is requested (represented by water stream 156 in FIG. 5). The controller 52 instructs the mixing valve 38 to operate at a hot water, low flow condition. This is indicated to the user by the controller 52 causing the indicator 130 to illuminate only red LEDs 132 with a low magnitude of light displayed. In other words the indicator 130 displays red LEDs with a low height level (i.e. close to lower end 152) within window 150.

A warm water, medium flow condition is represented by the indicator 130 in FIG. 6. More particularly, a user contacts segment 104e of region 92a corresponding to contact 118e of sensor 72, thereby instructing the controller 52 that a value of the applicable parameter (i.e. temperature) proportioned between ends 100a and 102a is requested. In this instance, contact 118e is the fifth contact from end 102a out of a total of ten contacts 118 such that the desired temperature is 50% of the maximum value of sensor 118j at end 100a. Similarly, the user contacts segment 106e of region 92b corresponding to contact 118e of sensor 72b, thereby instructing the controller 52 that a value of the applicable parameter (i.e., flow rate) proportioned between ends 100b and 102b is requested. Again, contact 118e is illustratively the fifth contact out of ten total contacts such that the desired flow rate is 50% of the maximum value of sensor 118j at end 100b (represented by water stream 158 in FIG. 6). The controller 52 instructs the mixing valve 38 to operate at this warm water, medium flow condition. This 50/50 hot/cold mixed water, 50% flow rate condition is indicated by indicator 130 by illuminating an equal ratio of blue LEDs 132 and red LEDs 134 (to display temperature as a purple color) and half of the total number of total LEDs 132 and 134 (to display half of the distance or height between the bottom and top 152 and 154 of the window 150).

A cold water, full flow condition is represented by the indicator 130 in FIG. 7. More particularly, a user contacts segment 104*a* of region 92*a* which corresponds to contact 118*a* of sensor 72*a*, thereby instructing the controller 52 that a maximum value of the applicable parameter (i.e., temperature) is desired. Similarly, the user contacts segment 106*j* of region 92*b* which corresponds to contact 118*j* of sensor 82*b*, thereby instructing the controller 52 that a maximum value of the applicable parameter (i.e., flow rate) is desired (represented by water stream 160 in FIG. 7). The controller 52 instructs the mixing valve 38 to operate at this cold water, full flow condition. The indicator 130, in turn, is directed by the controller 52 to illuminate only blue LEDs 132 (to display temperature) and all blue LEDs 132 (to display full height of LEDs 132 proximate the top 154 of window 150).

Although the invention has been described in detail with reference to certain preferred embodiments, variations and modifications exist within the spirit and scope of the invention as described and defined in the following claims.

The invention claimed is:

1. A water delivery system, comprising:
   at least one valve in fluid communication with a cold water source and a hot water source, the at least one valve including at least one actuator;
   an outlet in fluid communication with the at least one valve;
   a controller operably coupled to the at least one actuator; and
   an electronic user interface including:
      a first touch slider user input comprising a touch sensor that includes a plurality of contacts, the first touch slider user input operably coupled to the controller, wherein the controller is configured to control the at least one valve such that the at least one valve delivers a desired flow rate of water to the outlet based upon the first touch slider user input;
      a second touch slider user input comprising a touch sensor that includes a plurality of contacts, the second touch slider user input operably coupled to the controller, wherein the controller is configured to control the at least one valve such that the at least one valve delivers a desired temperature of water to the outlet based upon the second touch slider user input wherein the first touch slider user input is independent of the second touch slider user input, and the first touch slider user input is positioned in spaced relation to the second touch slider user input; and
      an indicator comprising a single light source array with first and second light source colors, said indicator operably coupled to the controller and configured to provide a combined indication of both the desired flow rate of water controlled by the first touch slider user input and the desired temperature of water controlled by the second touch slider user input.

2. The water delivery system of claim 1, wherein the at least one valve comprises a mixing valve in fluid communication with both the cold water source and the hot water source.

3. The water delivery system of claim 2, wherein the mixing valve includes a first valve member configured to control the temperature of water delivered to the outlet, and a second valve member configured to control the flow of water delivered to the outlet, and the at least one actuator includes a first actuator configured to move the first valve member, and a second actuator configured to move the second valve member.

4. The water delivery system of claim 1, further comprising a delivery spout supporting the outlet, wherein the electronic user interface coupled to the spout.

5. The water delivery system of claim 1, wherein the electronic user interface further includes a first task input, wherein in response to the selection of the first task input the controller controls the mixing valve to provide water having a predetermined temperature and a predetermined flow rate.

6. The water delivery system of claim 1, further comprising a diverter valve in fluid communication with the at least one valve and having a first position corresponding to a stream flow pattern and a second position corresponding to a spray flow pattern.

7. The water delivery system of claim 1, wherein each of the first touch slider and the second touch slider includes a base having a non-linear surface, and a capacitive sensing element supported on the non-linear surface.

8. The water delivery system of claim 7, further comprising a spout supporting the outlet, and a cover coupled to the spout, the first touch slider and the second touch slider.

9. The water delivery system of claim 1, wherein the indicator comprises a light source, the magnitude of the light emitted by the light source representing the flow rate of water selected for delivery to the outlet, and the color of the light emitted by the light source representing the temperature of the water selected for delivery to the outlet.

10. The water delivery system of claim 1, wherein the indicator comprises a first set of light sources of first color, and a second set of light sources of a second color.

11. The water delivery system of claim 10, wherein the first set of light sources comprises a plurality of blue light emitting diodes, and the second set of light sources comprises a plurality of red light emitting diodes, the number of combined blue light emitting diodes and red light emitting diodes illuminated being indicative of flow rate, and the ratio of red light emitting diodes and blue light emitting diodes illuminated being indicative of temperature.

12. An electronic user interface for a water delivery device, the electronic user interface comprising:
   a first user input to control the flow rate of water delivered to an outlet;
   a second user input to control the temperature of water delivered to an outlet, wherein the second user input is independent of the first user input; and
   an indicator comprising a single light source array with first and second light source colors, wherein the light source array changes the magnitude of light emitted based upon the active flow rate selected by the first user input and the light source array changes the color of light emitted depending upon the temperature selected by the second user input, wherein the light source array provides an integrated display for active flow rate selected by the first user input and temperature selected by the second user input.

13. The user interface of claim 12, wherein the light source includes a plurality of light emitting members arranged within a plane disposed intermediate the first user input and the second user input.

14. The user interface of claim 12, wherein the light source includes a plurality of first light emitting members configured to emit light of a first color, and a plurality of second light emitting members configured to emit light of a second color, the magnitude of light emitted being determined by the total number of first light emitting members and second light emitting members illuminated, and the color of light emitted being determined by the number of first light emitting members illuminated relative to the number of second light emitting members illuminated.

15. The user interface of claim 14, wherein the first color is blue and the second color is red, the number of first light emitting members illuminated relative to the number of second light emitting members illuminated increases as the temperature selected by the second user input decreases, and the number of second light emitting members illuminated relative to the number of first light emitting members illuminated increases as the temperature selected by the second user input increases.

16. The user interface of claim 12, further comprising a controller operably coupled to the first user input and the second user input, and a mixing valve in fluid communication with a cold water source and a hot water source and controlled by the controller to adjust the flow rate of water and the temperature of water delivered to the outlet.

17. The user interface of claim 16, further comprising a first task input, wherein in response to the selection of the first task input the controller controls the mixing valve to provide water having a predetermined temperature and a predetermined flow rate.

18. The user interface of claim 12, wherein:
the outlet is supported by a spout; and
the first user input, the second user input, and the indicator are supported by an end of the spout.

19. The user interface of claim 18, wherein the spout includes a diverter valve in fluid communication with an internal waterway of the spout and having a first position corresponding to a stream flow pattern and a second position corresponding to a spray flow pattern.

20. The user interface of claim 12, wherein the first user input comprises a first touch slider, the second user input comprises a second touch slider, and each of the first and second touch sliders comprises a touch sensor that includes a plurality of contacts.

21. The user interface of claim 20, wherein each of the first touch slider and the second touch slider includes a base having a non-linear surface, and a capacitive sensing element supported on the non-linear surface.

22. An apparatus for controlling the provision of water above a sink deck from a source of cold water and a source of hot water, the apparatus comprising:

a mixing valve in fluid communication with the source of cold water and the source of hot water, the mixing valve being located beneath the sink deck;
an electronic user interface located above the sink deck;
a spout in fluid communication with an outlet of the mixing valve; and
a controller operably coupled to the electronic user interface and to the mixing valve, wherein the electronic user interface includes a first touch slider user input for setting a desired water temperature and a second touch slider user input for setting a desired flow rate, each of the first and second touch slider user inputs comprising a touch sensor that includes a plurality of contacts, a plurality of preset task inputs corresponding to a plurality of predetermined water temperatures and active flow rates, and an indicator comprising a single light source array with first and second light source colors, said indicator configured to provide a combined indication of both the desired water temperature and the desired flow rate.

23. The apparatus of claim 22, wherein the electronic user interface is incorporated into an end of the spout.

24. The apparatus of claim 22, wherein the electronic user interface communicates wirelessly with the controller.

25. The apparatus of claim 22, wherein the electronic user interface includes a first task input, the first task input having a graphical icon representing the task.

26. The apparatus of claim 25, wherein in response to a selection of the first task input the controller controls the mixing valve to provide water having a predetermined temperature and a predetermined flow rate, the predetermined temperature and the predetermined flow rate corresponding to the task.

27. The apparatus of claim 26, wherein the spout includes a diverter valve in fluid communication with at least one internal waterway of the spout and having a first position corresponding to a stream flow pattern and a second position corresponding to a spray flow pattern.

28. The apparatus of claim 22, wherein the indicator comprises a light source, the magnitude of the light emitted by the light source representing the desired flow rate, and the color of the light emitted by the light source representing the desired water temperature.

* * * * *